March 26, 1963     F. BISZANTZ     3,083,059
AUTOMATIC TILTING DUMP TRUCK STABLIZER
Filed Nov. 13, 1958     2 Sheets-Sheet 1
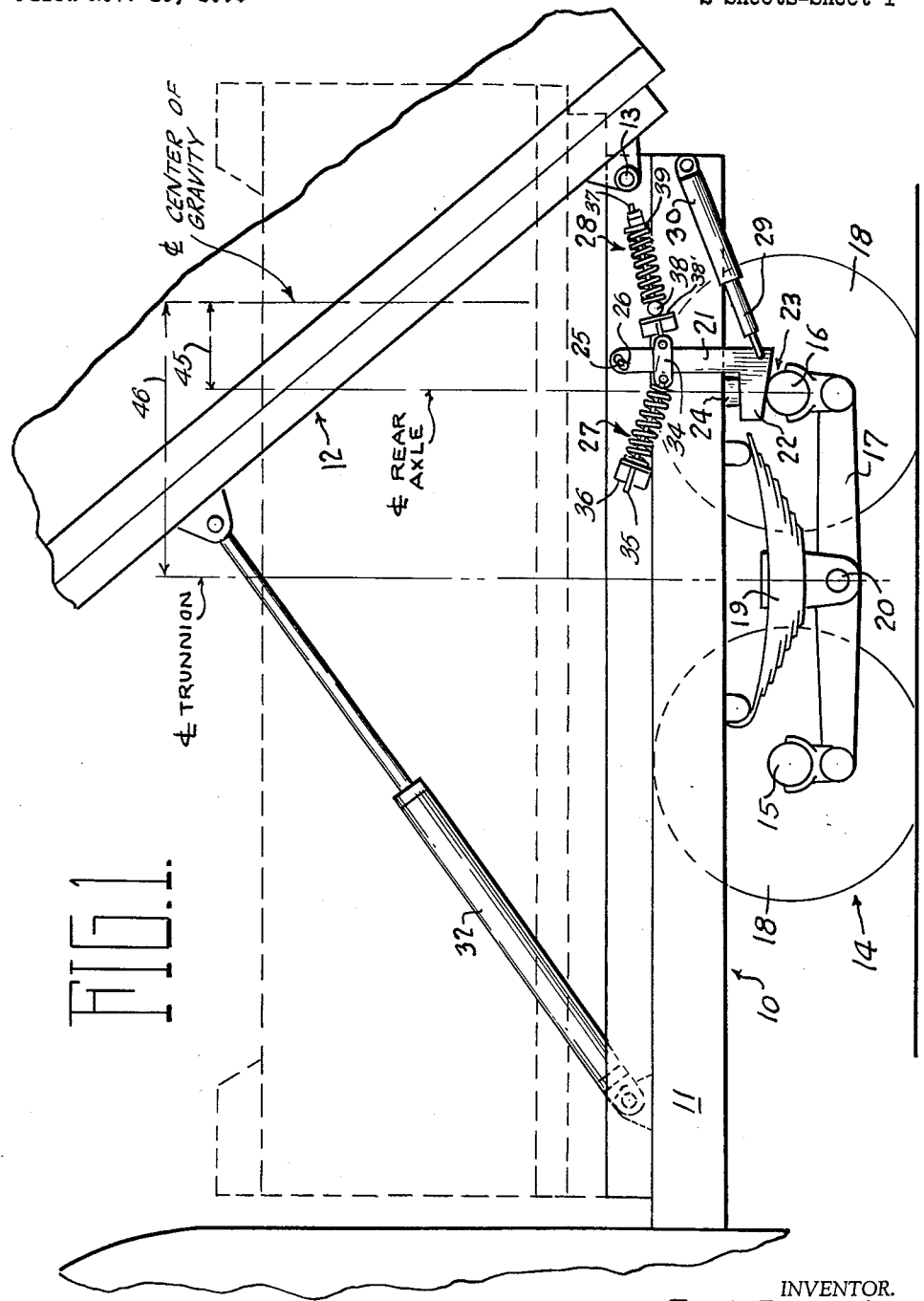
INVENTOR.
Fred Biszantz
BY
ATTORNEYS March 26, 1963 F. BISZANTZ 3,083,059
AUTOMATIC TILTING DUMP TRUCK STABLIZER
Filed Nov. 13, 1958 2 Sheets-Sheet 2
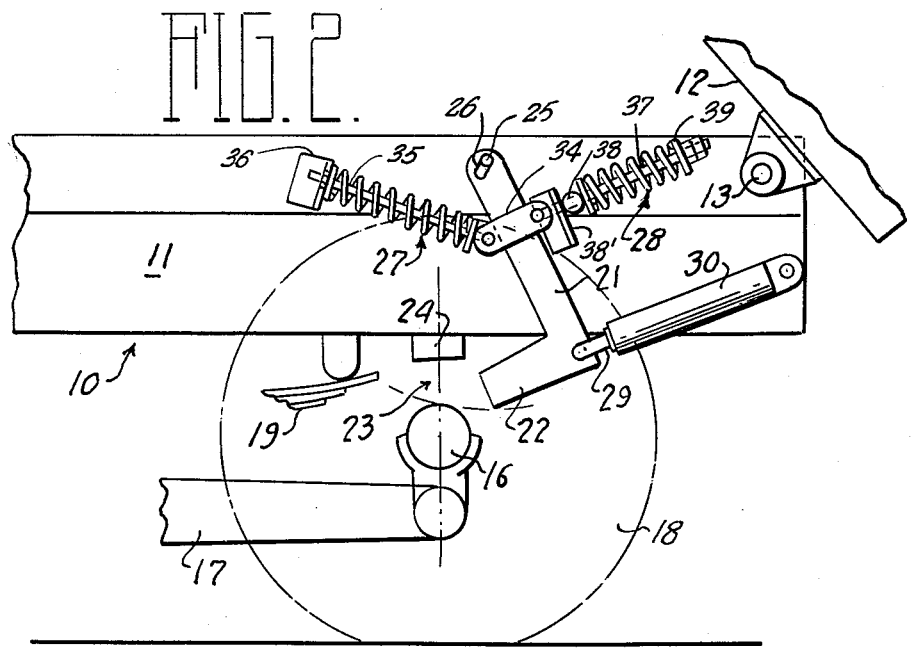
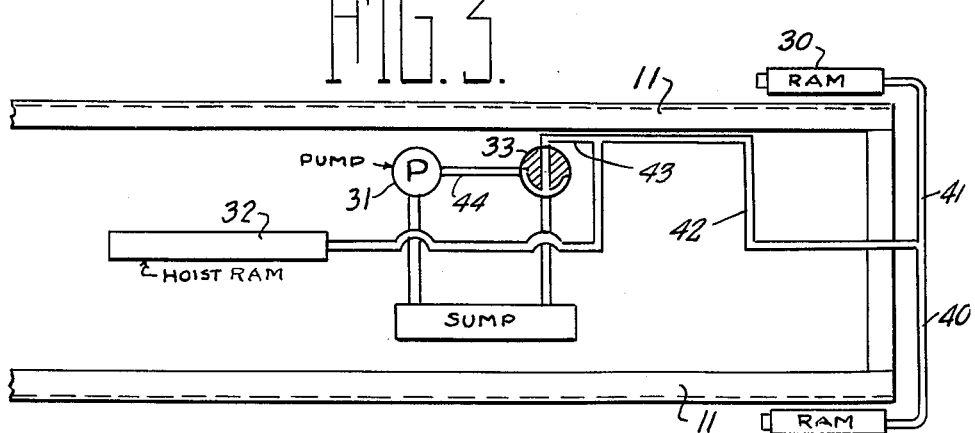
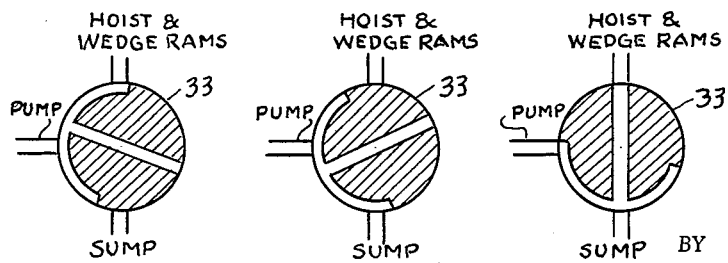
INVENTOR.
Fred Biszantz
BY
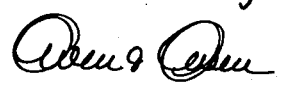
ATTORNEYS United States Patent Office 3,083,059
Patented Mar. 26, 1963

3,083,059
AUTOMATIC TILTING DUMP TRUCK
STABILIZER
Fred Biszantz, Galion, Ohio, assignor to Hercules Galion
Products Inc., a corporation of Delaware
Filed Nov. 13, 1958, Ser. No. 773,739
3 Claims. (Cl. 298—17)

This invention relates particularly to dump trucks of the tiltable body type and which are fitted with tandem rear axles, i.e., one in advance of the other, for facilitating hauling and dumping of extremely heavy loads.

In the use of such trucks, it is found that while tandem axles are satisfactory for the hauling of heavy loads, difficulty is encountered in the dumping operation due to the fact that, while the center of support of the rear end of the vehicle frame occurs midway of the space between the two rear axles when in the hauling position, the center of gravity of the load shifts in the course of dumping to such an extent that the center of gravity of the load and body may fall to the rear of the center of support and the vehicle will start to overturn in a rearward direction. If this occurs, the truck and its body may be damaged.

The primary object of the invention is the provision of means to shift the center of support of a loaded tandem axle truck body rearwardly with respect to the tandem axles, and to stabilize the body with relation to the supporting wheels and the ground.

Another object of the invention is the provision of simple and efficient automatically operated means for stabilizing the truck frame and preventing or lessening the liability of said rearward overturning action while dumping a load.

Other objects and advantages of the invention will be apparent from the following detailed description, and from the accompanying drawings illustrating one embodiment thereof, and in which—

FIG. 1 is a somewhat diagrammatic and fragmentary side elevational view of a dump truck embodying the present invention with the truck body in raised dumping position and the support means in supporting position;

FIG. 2 is a side elevational view of a stabilizing apparatus embodying the invention with the supporting means in released position after the load has been dumped and the truck body has started to lower to its normal position;

FIG. 3 is a diagram of a hydraulic circuit showing the relationship between the truck hoist cylinder and actuator for the stabilizing devices; and FIGS. 4, 5 and 6 are enlarged diagrammatical views of the control valve in different control positions.

In order to accomplish the purpose of the invention, there is provided at each side of the truck frame a stabilizing mechanism which automatically comes into action to firmly support the truck frame over the rear axle housing during body hoisting and dumping operation whereby the liability of rearward overturning is materially and efficiently lessened. In the present embodiment of the invention, each of these mechanisms includes a member having a spacing part or wedge element that is automatically inserted between the rear axle housing and a coacting part of the vehicle frame to provide a rigid support therebetween during a load dumping movement of the truck body and which member is withdrawn from said supporting position to again permit relative vertical movements of the frame and axle when the dumping operation has been completed.

In the drawings, 10 designates a conventional vehicle truck frame having the opposed side beam members 11, 11 and on which is mounted a load carrying body 12 that is pivoted at its rear end to the rear end of the frame, as at 13, for rearward tilting dumping movement, as well understood in the art. The frame at its rear is supported by a conventional tandem axle pair 14 having front and rear axles 15 and 16, respectively, carried by a frame 17 and provided at each end with a supporting wheel 18. A spring connection, conventionally shown at 19, is provided between the vehicle frame 11 and tandem axle frame 17, and this is pivoted to the frame 17 centrally between the two axles, as shown at 20, so that there may be a forward and rearward limited pivotal movement of one axle relative to the other.

The stabilizing means embodying the invention comprises a unit at each side of the vehicle frame 11 and adjacent to or substantially over the rear axle 16. Each of these units, in the present instance, includes a member 21 suspended from the frame 11 for forward and rearward pivotal movements and having at its lower end a forwardly projecting tongue or wedge element 22 adapted, upon a forward swinging of the member from rearward retracted position, to enter and vertically fill a space 23 between the rearmost axle 16 and a seating block 24 on the under side of the vehicle frame bottom. Thus the maximum vertical thickness of the wedge element must exceed the vertical distance between the seating block 24 and the axle 16 at the time of initiation of a dumping movement of the body. Entry of the wedge elements 22 on each side of the body holds the vehicle frame stable relative to the axle, and most importantly effectively shifts the center of support of the vehicle frame to a point directly over the rearmost axle. In one form of the invention the pivot pin 25 for the stabilizing member engages in a slot 26 in the upper end of said member to permit certain floating movements of the member relative to the pin during engagement. This slot is preferably diagonal to the longitudinal axis of the member, so that the pin 25 serves in conjunction with the control means hereinafter described to not only keep the wedge tongue 22 at maximum height to clear the axle while engaging but also to allow the tongue to contact both axle and bumper block 24 after engaging.

The member 21 is normally retained in retracted disengaged position, in the present instance, by two opposed coiled expansion springs 27 and 28 each having its inner end attached to the member and its outer end anchored to the frame 11. Thus, the spring 27 abuts a strap 34 attached to the member 21 and has a spring rod 35 pivotally connected to the strap 34 and slidably held by a guide ear 36 attached to the frame 11, with the spring 27 placed in compression between the ear 36 and the strap 34 when the member 21 moves forwardly. The spring 28 has a spring rod 37 slidably and pivotally held with respect to the frame 11 by means of a post 38 and a flange member 38'. The spring rod 37 also is pivotally connected to the strap 34 at its lower end. When the member 21 moves forwardly, the spring 28 in placed in compression between the post 38 and a plate 39 at the outer end of the rod 37.

The positive movements of the member 21 to force its wedge shaped tongue 22 into and to withdraw it from the space 23 are preferably caused by a ram rod 29 pivotally attached to the member 21 and the frame 11, projecting from a cylinder 30, and controlled by the alternate admission and exhaust of fluid pressure from its ends, as well understood in the art. The two cylinders 30 on each side of the truck are, in the present instance, connected through conduits 40–44 inclusive to a fluid pressure supply pump 31 which is a part of the system supplying pressure to the conventional hoist cylinder 32 for the dump body 12, as shown diagrammatically in FIG. 3. As there shown, a single three-way valve 33 can be used to control the filling and emptying of the stabilizing and hoist cylinders 30 and 32 in unison. The cylinder 32 is pivotally attached to the frame 11 and the body 12. In FIG. 4 the valve 33 is in hoisting position with the rams 29 and hoist 32 in extended positions. In FIG. 5 the valve 33 is in position for the hoist and wedge rams 32 and 29, respectively, to be held in extended positions. In this position the pump circulates the operating fluid through the sump tank. In FIG. 6 the valve 33 is in position for the hoist and wedge rams to return to closed or retracted positions. In this position the pump continues to circulate fluid through the sump tank. The rams 29 are extended automatically when a loaded body is tilted because hydraulic pressure is applied to the cylinders 30 when it is applied to the hoist ram 32.

It is apparent from the foregoing that the normal support for the vehicle frame 11 at each side thereof is through the respective wheel truck pin 20 which is located substantially centrally between the front and rear axles 15 and 16. Thus the normal center of support for the rear of the truck is midway between the front and rear of the tandem axles along a line designated "center line trunnion." By actuating the rams 29 to move the members 21 forward, the tongues or wedges 22 are forced forward into the registering spaces 23 in coaction with both the axle 15 and vehicle frame blocks 24 to provide a firm and stable support for the vehicle frame 11 directly over the rear axle adjacent to each end thereof. Thus the center of support for the rear of the truck now comes on a vertical line designated "center line rear axle" passing through the rear axle of the pair, and the center has been shifted rearwardly by a very substantial distance and much closer to the center of gravity of the load represented by a vertical line designated "center line center of gravity," as indicated by horizontal lines 45 and 46. Since the body is now supported not by the springs 19 but by a direct connection to the axle 16 it is very stable with respect to the ground, and rearward tipping of the body is prevented. It is also apparent that this stabilizing action is effected automatically during the rearward tilting or dumping movements of the truck body 12 due to the cylinders 30 being in circuit with the hoist cylinder 32. When the body 12 is lowered and hydraulic pressure is released on the rams 30 and 32, the springs 27 and 28, being in compression, will urge the member 21 and the wedge 22 rearwardly and will move them in that direction when the pressure on the wedge 22 between the block 24 and the axle 16 has decreased a sufficient amount.

While the invention has been described in conjunction with the use of wedging elements as the means for filling the space between the frame and rearmost axle of the tandem set, it will be appreciated that other and equivalent elements may be used to form, in effect, a rigid interconnection of these two parts. Thus the invention is capable of numerous modifications and changes without departing from the spirit of the claims.

What I claim is:

1. In a dump truck having a truck frame, a dump body pivotally mounted on said frame for rearward dumping movements relative thereto, which movements cause the center of gravity of a loaded body to shift rearwardly relative to the frame, and a rear axle assembly comprising a pair of tandem axles for said frame, the normal center of support of said frame passing midway between the tandem axles, the improvement comprising means on each side of the vehicle movable into and out of a space between only the rearmost of said tandem axles and said frame to shift the point of support from the midway point to said rearmost axle at each side when inserted, and means operable upon dumping movements of said body to move said last means into supporting position.

2. Apparatus in accordance with claim 1 in which said movable means includes a wedge element pivotally connected to said frame, the maximum vertical thickness of said wedge element exceeding the vertical distance between said frame and said rearmost axle at the time when said dump body commences a dumping movement.

3. Apparatus according to claim 2 wherein said dump body is operable by a hydraulic actuator, and said means operable upon dumping movements includes a hydraulic cylinder connected to said hydraulic actuator to enable both said cylinder and said actuator to fill and empty in unison, said hydraulic cylinder having a piston connected to the wedge element for pivotally moving said element into and out of the space between said rearmost axle and said frame.

References Cited in the file of this patent

UNITED STATES PATENTS

| | | |
|---|---|---|
| 1,581,358 | Mayer | Apr. 20, 1926 |
| 1,610,881 | Reinsch | Dec. 14, 1926 |
| 1,975,119 | Oates | Oct. 2, 1934 |
| 2,020,489 | Walker et al. | Nov. 12, 1935 |
| 2,189,052 | Anthony | Feb. 6, 1940 |
| 2,381,425 | Deal et al. | Aug. 7, 1945 |
| 2,438,571 | Maxon | Mar. 30, 1948 |
| 2,556,610 | Biszantz | June 12, 1951 |
| 2,662,780 | Talbert | Dec. 15, 1953 |
| 2,777,529 | Harbers | Jan. 15, 1957 |
| 2,997,342 | Talbert | Aug. 22, 1961 |
| 3,027,197 | Tripodi | Mar. 27, 1962 |